Dec. 3, 1963 L. J. SEMON 3,113,185

MONITOR CONTROL UNIT

Filed March 26, 1962

INVENTOR.
LAWRENCE J. SEMON
BY Elliott & Pastoriza
ATTORNEYS 3,113,185
Patented Dec. 3, 1963

3,113,185

MONITOR CONTROL UNIT

Lawrence J. Semon, 918 Ocean Front,
Santa Monica, Calif.

Filed Mar. 26, 1962, Ser. No. 182,336
4 Claims. (Cl. 179—42)

Figure 1:
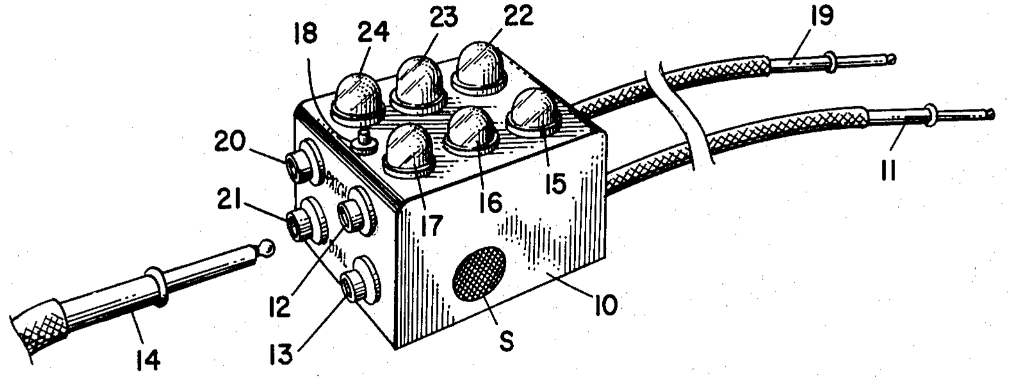

This invention relates generally to telephone equipment and more particularly to an improved monitor control unit for use in telephone answering services.

In a telephone answering service, an operator is provided with a central switchboard for receiving calls to a client in the event the client is not at home or in his office. Messages are taken and this information is communicated to the client when he calls in to the central office at a later time. In many instances, a client will leave a message with his answering service as to his whereabouts so that if a caller attempts to reach him, the answering service can make a direct connection between the incoming call and the particular telephone at the new location of the client.

Making a connection between an incoming call and a dialed out call at the central telephone answering switchboard is referred to in the art as "patching" and there is ordinarily provided for this purpose "jumper" leads for making the connection at the switchboard. However, it is essential that the jumper or connecting line be removed after the parties have completed their conversation as otherwise the telephone will remain tied up. It has thus been necessary in the past for the operator at the telephone answering service to periodically listen in to the "patched" line to determine whether or not conversation is still taking place. Such a procedure is not only time consuming and annoying to the parties, but can cause serious trouble in the event telephone lines are tied up longer than necessary.

In addition to the above, when the operator is dialing out to reach a party prior to effecting a "patching" operation, she must usually listen during the ringing of the called party's telephone until such time that the called party answers. It would be very convenient if the ringing of the called party could be automatically monitored such that a suitable indication could be provided when the telephone is answered so that the operator in the meantime could perform other functions. Similarly, when a called party is reached, the actual party with whom the operator desires to speak may not be present, but the answering person may request that the operator hold the line while the party actually desired is paged or otherwise called to the telephone. For the operator to wait on the line while the paging operation is being carried out is also inconvenient and wastes much of the operator's time. Therefore, it is also desirable that some indicating means be provided for advising the operator when a called party actually comes on the line after being paged.

With all of the foregoing in mind, it is a primary object of the present invention to provide an improved connecting means or "patch" for connecting an incoming call at an answering service to a dialed out call which will automatically apprise the operator both when a proper connection for conversation is in effect and when the conversation between the parties is completed.

More particularly, it is an object to provide a device of the foregoing type which does not require any periodic checking by the operator but which will provide automatically an oral and/or visual signal when the call is completed so that the operator can attend to other matters and the possibility of lines becoming inadvertently tied up is avoided.

Still another important object is to provide a device which will advise the operator when a dialed out call is answered to the end that the operator need not listen in on the line during the ringing operation.

Still onother object is to provide an improved device meeting all of the foregoing objects including means for advising an operator when a paged or called party comes on the line even though the line may be opened and answered by another person who temporarily leaves the telephone to page or find the desired party. By this arrangement, the operator's time is not wasted waiting on the line for a desired person to begin a conversation.

Another object is to provide an indicating means advising the operator when a "patched" call has been completed which is clearly distinguishable from other lights and buzzer sounds ordinarily provided at conventional switchboards so that the operator will not be confused as to which indicator advises her of a given function.

Another object is to provide a circuit for carrying out the foregoing objects which is relatively simpler than circuits heretofore proposed for carrying out certain of these functions to the end that economy is achieved in the manufacture of the monitor control unit.

Briefly, these and other objects and advantages of this invention are attained by providing an improved monitor control unit including input and output connectors for connection to an incoming call circuit and outgoing call circuit, respectively. A transmission line is provided for carrying intelligence between the respective input and output connectors and includes conventional tip and ring conductors. In the preferred embodiment of the invention, a relay coil is connected in series with the ring conductor and arranged to close a switch to operate a suitable indicator such as a light and/or tone signal in response to a change in voltage in the transmission line. Such a change in voltage will occur as a consequence of the voltage inherently available from an incoming call connection or an outgoing call connection when either connection is opened or closed or terminated. Thus, the indicating means will be energized when either party completes the call to advise the operator of completion of the patched call.

The improved monitor control unit also includes a second indicating means connected to the transmission line in such a manner that jiggling of the hook by one of the parties will energize the indicator to advise the operator that a party is ready to speak over the line. Also included is a third indicating means for advising the operator that a proper "patch" is in effect.

Figure 2:
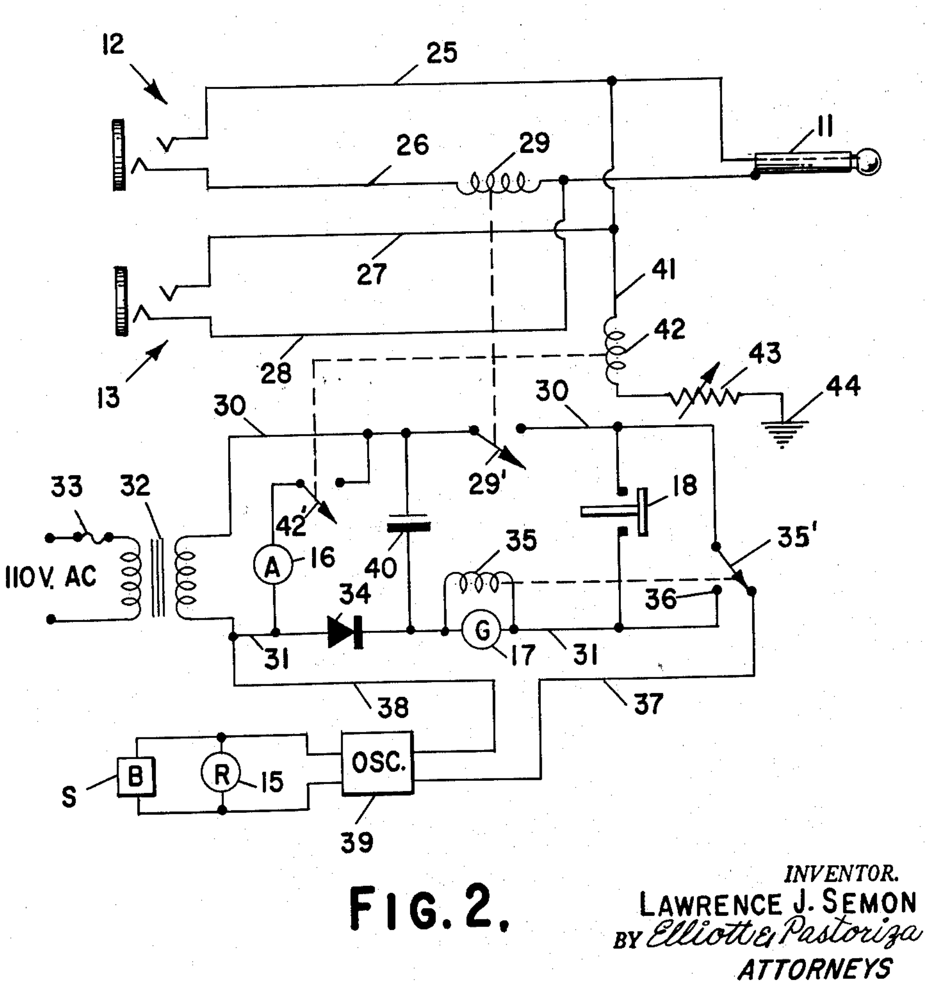

A better understanding of the manner in which the various foregoing means operate will be had by referring to a preferred embodiment of the invention as illustrated in the accompanying drawings, in which:

FIGURE 1 is a perspective view illustrating two of the improved monitor control units of this invention enclosed within a single casing structure; and, FIGURE 2 is a schematic electrical circuit diagram typical of either one of the units within the casing of FIGURE 1.

Referring to FIGURE 1, there is shown a casing 10 incorporating two of the units of the present invention. The first of these units includes an outgoing call plug 11 and an incoming call jack 12. There is also provided a dialing out jack 13.

An incoming call plug 14 is shown receivable in the jack 12 to effect patching between an incoming and outgoing call.

On top of the device, there are provided a row of lights constituting first, second, and third indicating means 15, 16, and 17, respectively. Also included is a speaker grill S for a beep or tone signal which operates as a part of the first indicating means or light 15. Preferably, the lights 15, 16, and 17 are colored red, amber, and green, respectively.

The top of the unit also includes a single manually operable push button 18.

As an example of the operation of the device shown in FIGURE 1, assume that a patient calls a doctor's office and the doctor is out of the office so that his telephone answering service answers the incoming call. The answering service is usually left with a telephone number where the doctor may be reached. The operator will then hold the incoming call which is on incoming call plug 14 and then dial out to the particular number left by the doctor. This is achieved by inserting a conventional dialing out plug (not shown) into the jack 13 and inserting the outlet plug 11 into the switchboard to dial out the call. One feature of the present invention is that the operator need not wait on the line during the ringing of the dialed out number but rather may simply wait until the second indicating means in the form of the amber light 16 flashes indicating that the phone has been answered at the other end.

When the phone has been answered, assume that rather than the doctor himself directly answering, his assistant or wife answers the phone. The operator will then request her to obtain the doctor. In some instances, it may be necessary that the doctor be paged to be brought to the line. Again, a feature of this invention resides in the fact that the operator need not wait during the paging operation but will be advised again by the second indicating means in the form of the amber light 16 when the doctor actually comes on the line.

When the doctor is on the line, the operator may then take the incoming call plug 14 and insert it into the jack 12, thereby patching the call through so that the incoming call on the plug 14 will pass directly through the outgoing call plug 11 and the patient can converse directly with the doctor. At this time, the operator will press the manual push button 18 to cause the third indicating means in the form of the green light 17 to light. This light will remain on after release of the button to indicate that conversation is taking place normally between the patient and his doctor.

When the conversation is completed and either party hangs up, the green light 17 will be extinguished and the first indicating red light 15 and tone signal behind the speaker grill S will be energized indicating to the operator that the conversation is completed and the patching connections should be removed.

A completely independent patching may be effected simultaneously by the outgoing call plug 19, jacks 20 and 21, and additional indicating means 22, 23, and 24 also incorporated within the same casing 10. The only feature common to both systems is the manual push button 18. The two units are packaged in one casing merely for convenience and to save space.

The manner in which the various indications are effected will be evident by now referring to FIGURE 2 which illustrates in detail the circuit for one of the units incorporated within the casing 10 of FIGURE 1. Since the other unit is identical, description of the one circuit will suffice for both.

As shown in FIGURE 2, there is provided between the outgoing call plug 11 and the incoming call jack 12 a transmission line comprising tip and ring conductors 25 and 26, respectively. The dialing out jack 13 in turn is connected through tip and ring conductors 27 and 28 directly in parallel with the conductors 25 and 26 so that any signal on a dialing out plug inserted within the jack 13 will be communicated directly to the calling out plug 11.

A first relay coil 29 is provided in series with the ring conductor 26 of the transmission line as shown. Generally, there are available voltages on the transmission lines 25 and 26 to operate the relay coil 29. These voltages will change when either party talking over the patching transmission lines 25 and 26 hangs up.

This relay coil 29 is arranged to operate a relay switch 29′ included in a first power line 30. The first power line 30 together with a second power line 31 connect across the secondary of a step down transformer 32 having its primary connected to a conventional 110 volt-A.C. outlet. There may be provided a fuse 33 in the primary circuit as shown.

The power line 31 includes a diode 34, second relay coil 35, and the second indicating means in the form of the green light 17 in parallel with the coil. The second power line 31 terminates in a terminal 36. The relay coil 35 is arranged to operate a second switch 35′ arranged such that upon energization of the relay coil 35, the switch 35′ will move to the terminal 36.

In its normal position, the switch 35′ connects to a line 37 so that the first power line 30 is connected to the line 37 when the first series switch 39′ is closed. The other power line 31 in turn connects to a branch lead 38. This lead 38 together with the lead 37 pass into a make-break circuit or slow oscillator 39, the output of which connects to the first indicating means 15 in the form of the red light and tone signal in parallel. The oscillator 39, when energized, effectively causes the light 15 to flash and the tone signal to keep periodically to not only more rapidly attract the attention of the operator when energized, but also to distinguish from other normal switchboard sounds in the answering service office.

The circuit also includes a D.C. blocking condenser 40 connected across the power leads 30 and 31 as shown.

The second indicating means in the form of the amber light 16 is shown connected across the power lines 30 and 31 and is arranged to be operated by voltage from line 25 and branch lead 41 connecting to a third relay coil 42 having a switch 42′ in series with the light. The other side of the relay coil 42 passes through a variable resistance 43 to ground at 44. With this arrangement, any change in voltage on the line 25 will result in a change in voltage through the relay coil 42 to cause the switch 42′ to open and close, thereby flashing the amber light 16.

The push button 18 as shown connects across the power leads 30 and 31 with one side connected between the first and second series switches 29′ and 35′, and the other side connecting to the line 31 and thus to the terminal 36.

In the operation of the circuit of FIGURE 2, assume as before, that a patient calls a doctor and the telephone answering service answers the call in view of the absence of the doctor from his office. Assume that the patient wishes to speak directly to the doctor by means of a "patch" at the telephone answering service bureau. The operator will then insert a conventional dialing out plug into the jack 13 and then insert the plug 11 in the dialing out jack on the switchboard. It will be noted from FIGURE 2 that the tip and ring conductors 27 and 28 connect directly to the tip and ring conductors 25 and 26 to the plug 11 so that a straight through connection is provided for the dialing out cord on the switchboard.

The operator after dialing a number may then attend to other activities, and ringing will take place in a normal manner. The operator need not listen in on the line to see when the phone is answered since when the receiver of the called party is removed, a change in voltage will occur on the tip conductor 25 thereby energizing the relay coil 42 and thus closing the switch 42′ to cause the amber light 16 to flash. Thus, the operator's time is not wasted during the ringing operation.

When the operator observes the change in the amber light 16, she then may ask for the doctor at the dialed out number. If the doctor answer directly, it is a simple matter for the operator to patch the incoming caller's call on the incoming plug 14 into the outgoing call by placing the plug 14 in the jack 12 so that transmission may take place over the tip and ring conductors 25 and 26. On the other hand, if the doctor does not answer the phone but his assistant or nurse or a hotel operator answers and it is necessary to page the doctor, the operator may again attend to other activities while the paging operation is taking place. When the doctor is finally located, he need only jiggle his hook up and down to attract the operator, this jiggling of the hook again causing the relay 42 shown in FIGURE 2 to be energized and de-energized rapidly as a consequence of changing of voltage on the tip conductor 25. Thus, the amber light 16 is caused to flash on and off advising the operator that the doctor is now ready to talk.

The operator may now plug in the incoming call plug 14 to the jack 12 thereby effecting a connection to the plug 11 through the tip and ring conductors 25 and 26 and the relay coil 29.

When the patching connection is first made, the relay coil 29 in the ring line 26 will be energized when both parties are on the line closing the switch 29′ and thereby permitting power from the transformer to pass through the conductor 30, switch 35′ and lead 37 to the first indicating means by way of the oscillator 39 so that the tone signal and red light 15 will be energized. The operator then manually depresses the button 18 which energizes the relay coil 35 to throw the switch arm 35′ to the terminal 36 thereby de-energizing the oscillator 39. The relay 35, however, is held by current through the arm 35′ to terminal 36. Thus, release of the push button 18 will not result in arm 35′ returning to its first position.

With coil 35 energized, the third energizing means in the form of the green light 17 connected across relay coil 35 will also be energized. The operator, when she sees the green light 17 shine steadily, knows then that the two parties are properly connected and are talking together and normal conversation is taking place. She may then attend to other activties.

When now either the patient or the doctor should hang up or both should hang up when the telephone call is completed, the resulting change in voltage on the transmission lines 25 and 26 will cause the switch 29′ to open momentarily so that the relay coil 35 is de-energized. Upon de-energization of the relay coil 35, the switch 35′ will move from the terminal 36 back to engagement with the first indicating means comprising the oscillator 39 and bulb 15 and the tone signal B. The red light 15 will thus flash as a consequence of the oscillator 39 and simultaneously there will be a periodic beep tone from the speaker grill S. The operator will then be apprised that the conversion is completed and she can disconnect the patching cords preparatory for subsequent use for another call to be patched. In this manner, the operator is not wasting any time. In addtion, by the use of a distinct beep sound and a red light which flashes, the operator's attention is not only easily attracted, but the signals are distinguished from other normal switchboard sounds.

If the second patching unit incorporated in the casing 10 of FIGURE 1 is being used, the same manual push button 18 can be actuated for that unit even if the unit itself is being used simultaneously with the first unit. This is because the switch button 18 is normally open and is only momentarily closed so that the relay coil 35 will lock in the switch 35′. Thus, this single button 18 may serve a dual function in that it can energize the corresponding relay coil in the other circuit when the other circuit is being used to patch a call even though a normal patching conversation may be in effect on the first circuit. Since the relay coil 35 is already energized when a patching conversation is taking place in the first unit, pushing the button 18 subsequently will not affect its operation.

From the foregoing description, it will be evident that the present invention has provided a greatly improved monitor control unit wherein the operator need only attend to the unit at specified times. Thus, the operator is free during a ringing period, during a paging period a person is to be called or paged, and during the period that the two callers are talking to each other.

What is claimed is:

1. A monitor control unit for use with a telephone switchboard having incoming and outgoing circuits in which voltage is available on at least one of said circuits when answering an incoming call and effecting an outgoing call, said control unit including: a transmission line including tip and ring conductors having input and output connectors for connection to said incoming and outgoing circuits respectively; a source of electrical energy; first indicating means; first and second switches connected in series between said source and said first indicating means; a first coil for operating said first switch connected in series with one of said conductors in said transmission line and responsive to said voltage to close said first switch; a second coil for operating said second switch, said second coil being connected between said source and said terminal to move said second switch from a position connecting said source to said first indicating means through said first switch to a position engaging said terminal; and a push button switch connected between the junction of said first and second switches and said terminal whereby operation of said push button will energize said second relay coil when said first switch is closed to move said second switch to said terminal and maintain said second relay coil energized, a change of voltage on said transmission line in response to termination of a call momentarily de-energizing said first relay coil to open said first switch thereby de-energizing said second relay coil to return said second switch to its position in engagement with said first indicating means to energize the same and indicate completion of said call.

2. A monitor control unit according to claim 1, including a second indicating means and a third switch means connected in series with each other across said source of electrical energy; and a third relay coil for operating said third switch and connected between the other of said conductors in said transmission line and ground, a change of voltage on said other of said transmission line conductors in response to rapid connection and disconnection of one of said incoming and outgoing call circuits operating said third relay coil to energize said second indicating means.

3. A monitor control unit according to claim 2, including a third indicating means connected between said source and said terminal whereby movement of said second switch to said terminal in response to pressing of said push button de-energizes said first indicating means and maintains said third indicating means energized until said second relay coil is de-energized.

4. A monitor control unit according to claim 3, in which said first relay coil is in series with said tip conductor and said third relay coil is connected to said ring conductor, and in which said first indicating means includes a light and tone signal in parallel with each other for simultaneous operation and a make-break control circuit responsive to connection to said source of electrical energy through said first and second switches to cause said light and tone signal to operate on and off in rapid sequence so that the attention of an operator is attracted.

No references cited.